US012593088B2

(12) United States Patent
Davis et al.

(10) Patent No.: US 12,593,088 B2
(45) Date of Patent: ***Mar. 31, 2026

(54) METHODS AND APPARATUS TO DETERMINE MEDIA EXPOSURE OF A PANELIST

(71) Applicant: The Nielsen Company (US), LLC, New York, NY (US)

(72) Inventors: Jeremey M. Davis, New Port Richey, FL (US); Nicholas Mannion, Towson, MD (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/893,256

(22) Filed: Sep. 23, 2024

(65) Prior Publication Data

US 2025/0016390 A1     Jan. 9, 2025

Related U.S. Application Data

(63) Continuation of application No. 18/358,023, filed on Jul. 25, 2023, now Pat. No. 12,114,028, which is a continuation of application No. 17/328,987, filed on May 24, 2021, now Pat. No. 11,758,208, which is a continuation of application No. 16/230,605, filed on Dec. 21, 2018, now Pat. No. 11,019,380.

(51) Int. Cl.
*H04N 21/24*      (2011.01)
*G06Q 30/0201*    (2023.01)

*H04N 21/8355*    (2011.01)
*H04N 21/845*     (2011.01)

(52) U.S. Cl.
CPC ..... *H04N 21/2407* (2013.01); *G06Q 30/0201* (2013.01); *H04N 21/8355* (2013.01); *H04N 21/8456* (2013.01)

(58) Field of Classification Search
None
See application file for complete search history.

(56) References Cited

U.S. PATENT DOCUMENTS

| | | | | |
|---|---|---|---|---|
| 10,356,579 | B2 * | 7/2019 | Papakostas | ............. H04W 4/50 |
| 11,019,380 | B2 * | 5/2021 | Davis | ................. H04N 21/8355 |
| 11,758,208 | B2 * | 9/2023 | Davis | ................. H04N 21/2407 |
| | | | | 725/14 |
| 2014/0282665 | A1 * | 9/2014 | Arini | ................ H04N 21/41407 |
| | | | | 725/18 |
| 2016/0191970 | A1 * | 6/2016 | Sheppard | ........... G06Q 30/0204 |
| | | | | 725/14 |

(Continued)

*Primary Examiner* — Alexander Q Huerta

(57)     ABSTRACT

Methods, apparatus, systems and articles of manufacture to determine media exposure of a panelist are disclosed. An example apparatus include memory; computer readable instructions; and processor circuitry to execute the computer readable instructions to: determine an anonymized identifier from media monitoring data corresponding to a personal people meter of a panelist; filter anonymized census data from a plurality of media devices based on the anonymized identifier; when second media data different than first media data is included in the media monitoring data during a same time duration, tag the time duration as corresponding to multiple media exposure; and credit exposure to media for the panelist based on the tag.

20 Claims, 5 Drawing Sheets

(56)                References Cited

U.S. PATENT DOCUMENTS

| 2016/0292698 | A1* | 10/2016 | Piotrowski | ......... | G06Q 30/0211 |
| 2020/0051122 | A1* | 2/2020 | Steuer | ............... | G06Q 30/0246 |
| 2021/0232959 | A1* | 7/2021 | Sheppard | ................ | G06N 7/01 |

\* cited by examiner

100

MEDIA
PROVIDER
102

124

AME

PANELIST
ACTIVITY
DETERMINER

126

128

DATABASE

122

NETWORK

104

118

112

111

114

116

108

PANELIST

106

112

114

110

NON-PANELIST    FIG. 1

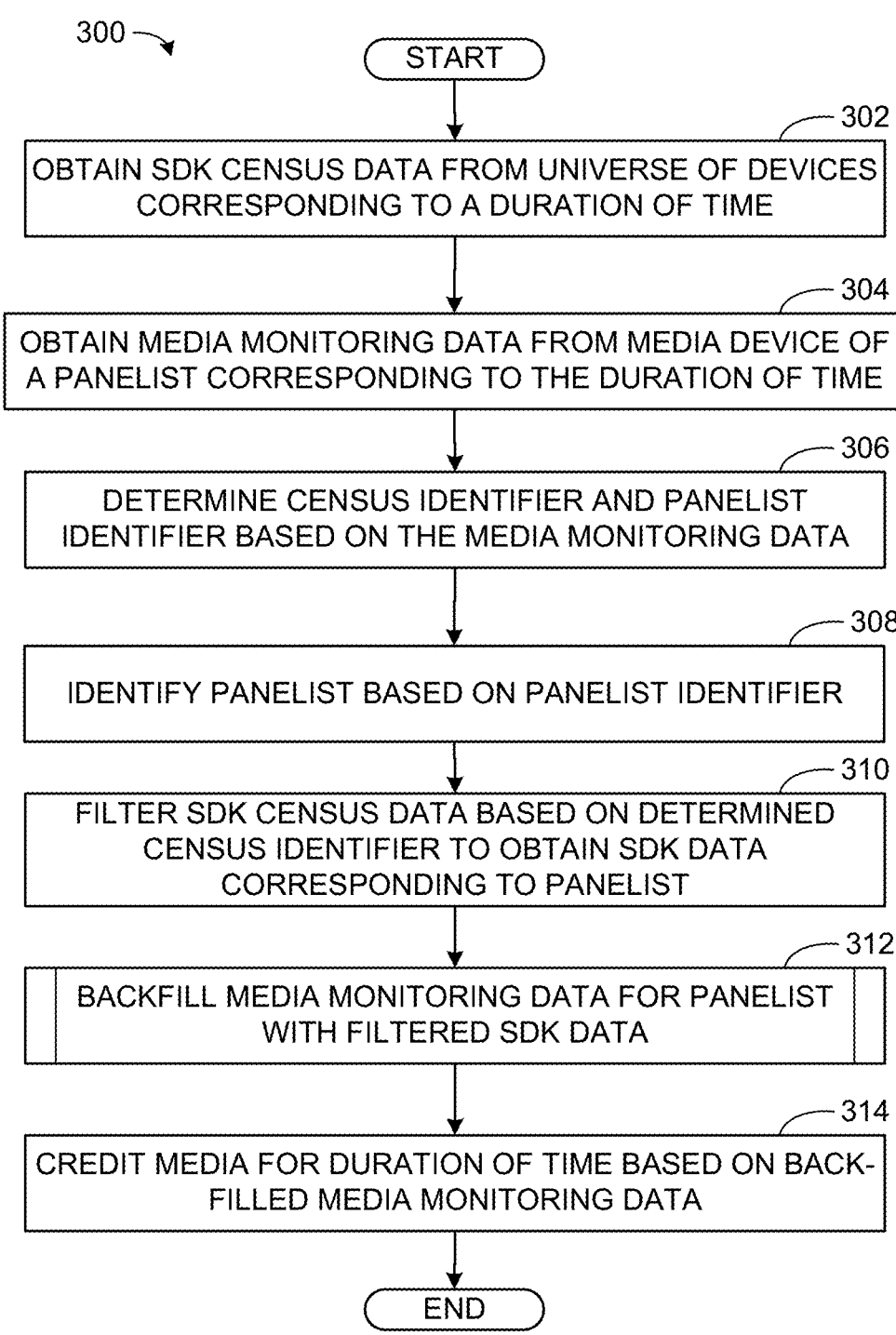

300

START

302

OBTAIN SDK CENSUS DATA FROM UNIVERSE OF DEVICES CORRESPONDING TO A DURATION OF TIME

304

OBTAIN MEDIA MONITORING DATA FROM MEDIA DEVICE OF A PANELIST CORRESPONDING TO THE DURATION OF TIME

306

DETERMINE CENSUS IDENTIFIER AND PANELIST IDENTIFIER BASED ON THE MEDIA MONITORING DATA

308

IDENTIFY PANELIST BASED ON PANELIST IDENTIFIER

310

FILTER SDK CENSUS DATA BASED ON DETERMINED CENSUS IDENTIFIER TO OBTAIN SDK DATA CORRESPONDING TO PANELIST

312

BACKFILL MEDIA MONITORING DATA FOR PANELIST WITH FILTERED SDK DATA

314

CREDIT MEDIA FOR DURATION OF TIME BASED ON BACK-FILLED MEDIA MONITORING DATA

END

FIG. 3

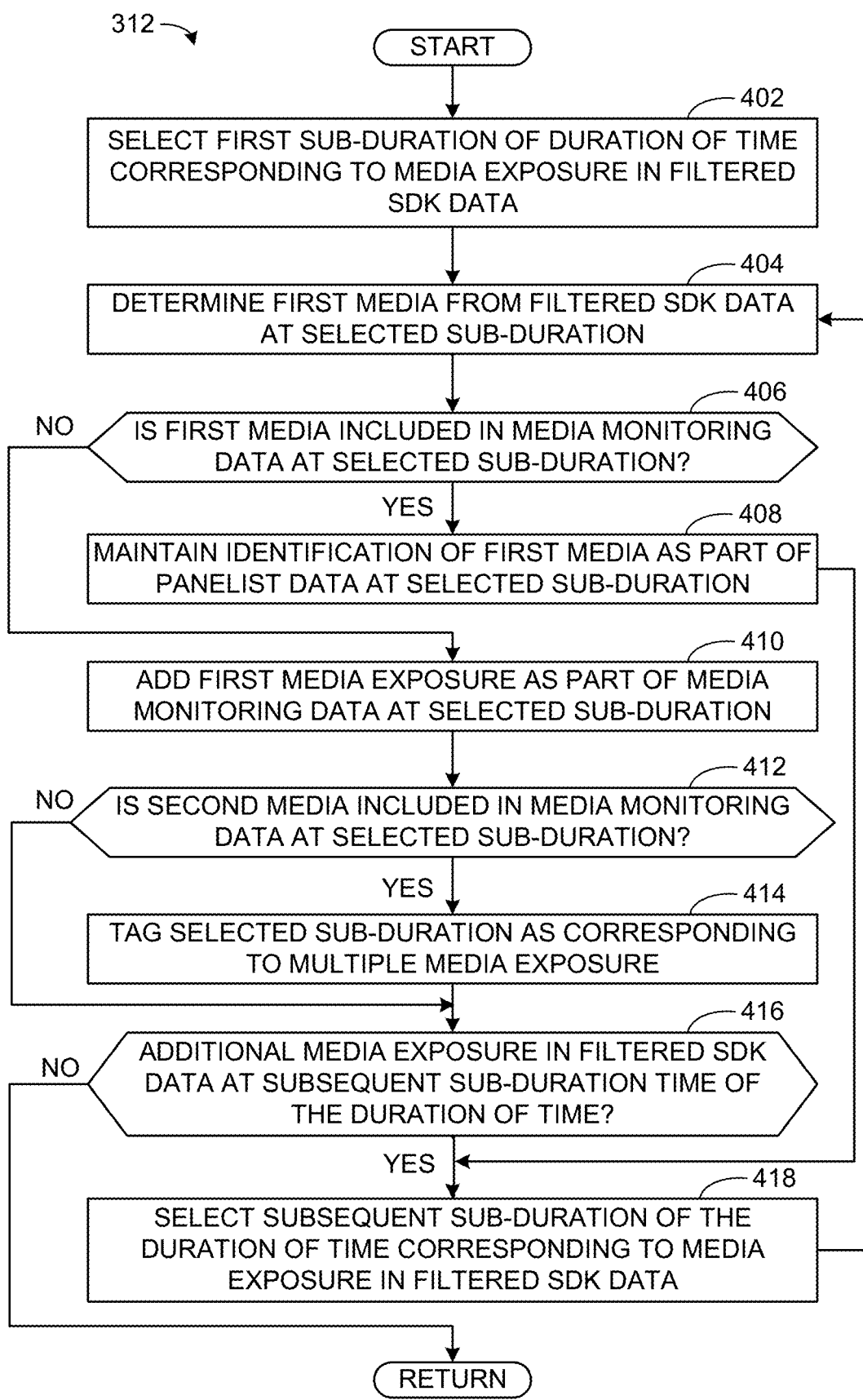

312

START

402
SELECT FIRST SUB-DURATION OF DURATION OF TIME CORRESPONDING TO MEDIA EXPOSURE IN FILTERED SDK DATA

404
DETERMINE FIRST MEDIA FROM FILTERED SDK DATA AT SELECTED SUB-DURATION

406
IS FIRST MEDIA INCLUDED IN MEDIA MONITORING DATA AT SELECTED SUB-DURATION?
NO

YES

408
MAINTAIN IDENTIFICATION OF FIRST MEDIA AS PART OF PANELIST DATA AT SELECTED SUB-DURATION

410
ADD FIRST MEDIA EXPOSURE AS PART OF MEDIA MONITORING DATA AT SELECTED SUB-DURATION

412
IS SECOND MEDIA INCLUDED IN MEDIA MONITORING DATA AT SELECTED SUB-DURATION?
NO

YES

414
TAG SELECTED SUB-DURATION AS CORRESPONDING TO MULTIPLE MEDIA EXPOSURE

416
ADDITIONAL MEDIA EXPOSURE IN FILTERED SDK DATA AT SUBSEQUENT SUB-DURATION TIME OF THE DURATION OF TIME?
NO

YES

418
SELECT SUBSEQUENT SUB-DURATION OF THE DURATION OF TIME CORRESPONDING TO MEDIA EXPOSURE IN FILTERED SDK DATA

RETURN

FIG. 4

METHODS AND APPARATUS TO DETERMINE MEDIA EXPOSURE OF A PANELIST

CROSS-REFERENCE TO RELATED APPLICATIONS

This disclosure is a continuation of U.S. patent application Ser. No. 18/358,023, filed Jul. 25, 2023, now U.S. Pat. No. 12,114,028, which is a continuation of U.S. patent application Ser. No. 17/328,987, filed May 24, 2021, now U.S. Pat. No. 11,758,208, which is a continuation of U.S. patent application Ser. No. 16/230,605, filed on Dec. 21, 2018, now U.S. Pat. No. 11,019,380, each of which is hereby incorporated by reference in their entireties.

FIELD OF THE DISCLOSURE

This disclosure relates generally to media monitoring and, more particularly, to methods and apparatus to determine media exposure of a panelist.

BACKGROUND

Media players on electronic devices (e.g., smartphones, tablet computers, computers, etc.) enable access to a wide range of media. The media can be streamed from the Internet via a browser or an application dedicated for streaming media or playing media. Many media streaming websites or applications stream advertisements along with content selected for presentation by a viewer or machine (e.g., web crawler) or output of audio by a speaker or headphone. For example, if a viewer chooses to listen to a song on Spotify™, an advertisement may be streamed in an audio player application of Spotify™ before the chosen audio is output.

BRIEF DESCRIPTION OF THE DRAWINGS

FIGS. 3 and 4 are flowcharts representative of example machine readable instructions which may be executed to implement the example panelist activity determiner of FIGS. 1 and/or 2.

The figures are not to scale. In general, the same reference numbers will be used throughout the drawing(s) and accompanying written description to refer to the same or like parts.

DETAILED DESCRIPTION

Figure 1:
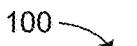
FIG. 1 illustrates and example environment for measuring panelist exposure to media in conjunction with teachings of this disclosure.

Consuming media presentations generally involves listening to audio information and/or viewing video information such as, for example, radio programs, music, television programs, movies, still images, etc. Media-centric companies such as, for example, advertising companies, broadcast networks, etc. are often interested in the viewing and listening interests of their audience to better market their products and/or to improve their programming. A well-known technique often used to measure the exposure and/or number of audience members exposed to media involves awarding media exposure credit to a media presentation for each audience member that is exposed to the media presentation.

Media exposure credit is often measured by monitoring the media consumption of audience members using, for example, portable people meter (PPMs), also known as portable metering devices and portable personal meters. A PPM is an electronic device that is typically worn (e.g., clipped to a belt or other apparel) or carried by a panelist (e.g., an audience member) and configured to monitor media consumption (e.g., viewing and/or listening activities) using any of a variety of media monitoring techniques. For example, one technique for monitoring media consumption involves detecting or collecting information (e.g., ancillary codes, signatures, etc.) from audio and/or video signals that are emitted or presented by media presentation devices (e.g., televisions, stereos, speakers, computers, video display devices, video games, mobile telephones, etc.) and comparing the collected information to reference information to identify the media. Panelists are persons that have agreed to be monitored by, for example, an audience measurement entity (AME) such as The Nielsen Company (U.S.), LLC. Typically, such panelists provide detailed demographic information (e.g., race, age, income, home location, education level, gender, etc.) when they register to participate in the panel.

While wearing a PPM, an audience member or monitored individual performs their usual daily routine, which may include listening to the radio and/or other sources of audio media and/or watching television programs and/or other sources of visual media. As the audience member is exposed to (e.g., views, listens to, etc.) media, a PPM associated with (e.g., assigned to and carried by) that audience member detects audio and/or video information associated with the media and generates monitoring data. In general, monitoring data may include any information that is representative of (or associated with) and/or that may be used to identify a particular media presentation (e.g., a song, a television program, a movie, a video game, etc.) and/or to identify the source of the media presentation (e.g., a television, a digital video disk player, a stereo system, etc.). For example, the monitoring data may include signatures that are collected or generated by the PPM based on the media, audio codes that are broadcast simultaneously with (e.g., embedded in) the media, infrared (IR) or radio frequency (RF) signals emitted by a remote control device and/or emitted by a transceiver configured to transmit location information, information supplied by the audience member using any of a variety of data input devices, etc.

Although PPMs measurement can generate accurate media monitoring data by extracting codes and/or generating signatures from ambient audio to generate media monitoring data (e.g., data corresponding to media to which a panelist was exposed), a PPM can only generate media monitoring data for audio that is loud enough to be detected by a sensor of the PPM and/or video that is within range of a camera or sensor of the PPM (e.g., when the PPM is implemented with a camera in a headset, for example). Accordingly, if the panelist listens to audio (e.g., music, commercials, radio, and/or audio of a video) from a media device (e.g., a smart phone, tablet, laptop, etc.) while audio can not be ambiently collected (e.g., because the panelist is listening with headphones), such media exposure will be absent from the media monitoring data generated based on the PPM (e.g., because a PPM may not sense audio from a headphone). Additionally, if the panelist is using PPM (e.g., a smart headset, Google Glass, etc.) that includes a camera to track media exposure, if the headset is off or not directed at the media, such media exposure will be absent from the media monitoring data generated by the PPM. Some PPMs include a headphone jack for tracking audio output by a media device. However, panelist compliance with the headphone jack of the PPM is typically low. Further, to reduce the size and/or weight of the PPM and/or to waterproof the PPM, next generation PPMs may not include a headphone jack. Accordingly, examples disclosed herein supplement incomplete media monitoring data using software development kit (SDK) census data.

When an audience measurement entity (AME) partners with a media provider (e.g., Spotify®, Shoutcast®, Stitcher®, Netflix®, YouTube®, Hulu®, Pandora®, Last.fm®, etc.), the media provider may agree to let the AME install an SDK on an application, device, or website of the media provider or other entity. The SDK monitors user exposure to the media. For example, when a user streams a song, watches a video, views an advertisement, etc. on the application or website, the SDK tracks the media exposure and transmits the tracked media exposure information to the AME. To preserve the identity/anonymity of the media provider users, the SDK generates an anonymous identifier so that the AME does not know the real identifier of the user. The anonymous media exposure information is herein referred to as SDK census data. A panelist may be exposed to media of the media provider on a media device using headphones. As a result, the SDK census data may include the information that the incomplete media monitoring data corresponding to a PPM is missing. However, because the SDK census data is anonymized with the SDK census identifier, examples disclosed herein link the panelist identifier to the SDK census identifier at the media device of a panelist using an AME application running on the media device. In this manner, examples disclosed herein can leverage the SDK census data corresponding to a panelist to backfill incomplete media monitoring data corresponding to a PPM of the panelist.

FIG. 1 illustrates and example environment 100 for measuring panelist exposure to media in conjunction with teachings of this disclosure. The example environment 100 includes an example media provider 102, an example panelist 104, an example non-panelist 106, example media device(s) 108, 110, an example PPM 111, example wireless interfaces 112, example SDKs 114, an example Bluetooth interface 116, an example AME application 118, an example network 122, an example AME 124, an example panelist activity determiner 126, and an example database 128.

The media provider 102 of the illustrated example of FIG. 1 corresponds to any one or more media provider(s) capable of providing media for presentation via the media devices 108, 110. The media provided by the media provider 102 can provide any type(s) of media, such as audio, video, multimedia, etc. Additionally, the media can correspond to live media, streaming media, broadcast media, stored media, on-demand content, etc. In some examples, the media provider 102 of the illustrated example of FIG. 1 is a server providing Internet media (e.g., web pages, audio, videos, images, etc.). The media provider 102 may be implemented by a digital broadcast provider (cable television service, fiber-optic television service, etc.) and/or an on-demand digital media provider (e.g., Internet streaming video and/or audio services such as Spotify®, Shoutcast®, Stitcher®, Netflix®, YouTube®, Hulu®, Pandora®, Last.fm®, etc.) and/or any other provider of streaming media services. In some other examples, the media provider 102 is a host for web site(s). Additionally or alternatively, the media provider(s) 102 may not be on the Internet. For example, the media provider may be on a private and/or semi-private network (e.g., a LAN, a virtual private network) to which the media device(s) 108, 110 connect via the example network 122.

The panelist 104 of FIG. 1 is a person that has agreed to be monitored by the AME 124. When the panelist 104 agrees to be part of a panel, the panelist 104 wears or carries the example PPM 111 to monitor exposure to audio of media, as further described below. Additionally, the panelist 104 is required to install the example AME application 118 on the media device 108 to be able to transmit monitored audio data from the PPM 111 to the AME 124 via the media device 108, as further described below. The non-panelist 106 is not a member of the panel. Rather, the non-panelist 106 is an audience member that may access media provided by the media provider 102 on the media device 110.

The media devices 108, 110 of FIG. 1 are devices that retrieve media from the media provider 102 for presentation or output. In some examples, the media devices 108, 110 are capable of directly presenting media (e.g., via a display or internal speakers) while, in some other examples, the media devices 108, 110 present the media on separate media presentation equipment (e.g., external speakers, an external display, headphones/earphone, earbuds, etc.). For example, the media devices 108, 110 of the illustrated example are mobile phones (e.g., smart phones), and thus, are capable of outputting media (e.g., via an integrated display and speakers) and/or may output the media using an external device (e.g., connected headphones, connected speakers, Bluetooth speakers, connected display, etc.). Alternatively, either of the media devices 108, 110 may be a gaming console (e.g., Xbox®, Playstation® 3, etc.), a streaming media device (e.g., a Google Chromecast, an Apple TV) a smart media device (e.g., an iPad, a tablet, etc.), digital media players (e.g., a Roku® media player, a Slingbox®, etc.), a smart television, a computing device, etc. The example media devices 108, 110 may utilize an application to access media from the media provider 102 via the network 122. For example, the media devices 108, 110 may use a Spotify® application to stream music provided by the media provider 102. As further described below, the media device 108 of the panelist 104 includes the wireless interface 112, the SDK 114, the Bluetooth interface 116, and the AME application 118. The media device 110 of the non-panelist 106, includes the wireless interface 112 and the SDK 114.

The example PPM 111 of FIG. 1 is a device that may be carried or worn by the example panelist 104 as shown in FIG. 1. In particular, the example PPM 111 may be configured to monitor media to which the panelist 104 is exposed using one or more media detection devices. For example, the PPM 111 may include one or more media detection devices (e.g., sensor(s), microphone(s), camera(s), etc.) used to detect presented media and generate or collect media monitoring information or media-related data based on, for example, audio signals, visual signals, radio frequency signals, etc. In some examples, the PPM 111 may collect media monitoring information (e.g., ancillary codes, signatures, etc.) associated with any media (e.g., video, audio, movies, music, still pictures, advertising, computer information, etc.) to which the panelist 104 is exposed. For example, the PPM 111 may be configured to obtain audio codes (e.g., watermarks), generate or collect signatures, fingerprints, etc. that may be used to identify video programs (e.g., DVD movies, steaming video, television programming, etc.), audio programs (e.g., CD audio, steaming audio, radio programming, etc.), advertisements, etc. by sensing ambient audio. In another example, the PPM 111 may include a camera or other sensor to obtain video codes (e.g., watermarks), generate or collect video signature, fingerprints, etc. that may be used to identify video programs, audio programs, advertisements, etc. by sensing ambient video using the camera or sensor. In some examples, the PPM 111 and/or the media device 108 may identify the media based on the codes embedded in the media and/or the signatures generated based on the media. For example, the PPM 111 and/or media device 108 may compare the obtained codes and/or generated signatures to a database of reference codes and/or reference signatures to identify a match corresponding to particular media. In such examples, the identified media is included in media monitoring data that may be transmitted to the example AME 124 for further analysis/processing (e.g., to credit exposure to the media). In some examples, the PPM 111 forwards the obtained codes and/or generated signatures to the media device 108 to transmit to the AME 124 (e.g., as unprocessed media monitoring data). In such examples, the AME 124 pre-processes the unprocessed media monitoring data to identify the media corresponding to the obtained codes and/or generated signatures at the AME 124 prior to crediting the media.

The example wireless interfaces 112 of FIG. 1 transmit and receive data via wireless communications (e.g., a cellular communication, a Wi-Fi communication, etc.) using the example network 122. For example, the wireless interface 112 may receive media from the example media provider 102 to be presented/output by the media device 108 and/or an external component connected (e.g., via a wired or wireless connection) to the media device 108. Additionally, the wireless interface 112 may transmit panelist data (e.g., media monitoring data) and/or SDK census data to the example AME 124 via the network 122.

The example SDK 114 of FIG. 1 is a program owned by the example AME 124 that runs on the example media device 108 in conjunction with the media provider 102. For example, the AME 124 and the media provider 102 enter into an agreement under which the AME 124 is allowed to utilize the SDK 114 whenever media provided by the media provider 102 is output by the media device 108. Accordingly, when a user (e.g., the panelist 104 and/or the non-panelist 106) watches video and/or listens to audio provided by the example media provider 102 using the media device 108, the SDK 114 monitors the audio and/or video being output by the media device 108 and/or a device (e.g., display, speaker, headphone, etc.) connected to the media device 108. Periodically, aperiodically, or based on a schedule, the SDK 114 transmits SDK census data corresponding to the monitored media (e.g., identifying video and/or audio output by the media device 108) to the AME 124 using the wireless interface 112. To preserve the privacy of the user, the SDK 114 anonymizes the data by running an algorithm to generate an anonymized identifier (e.g., a census identifier) that is included with the SDK census data. In this manner, the AME 124 can determine to what media a user has been exposed without identifying the user.

The example Bluetooth interface 116 of FIG. 1 receives media monitoring data (e.g., processed or unprocessed) from the PPM 111 via wireless communications (e.g., Bluetooth, Bluetooth Low Energy, ZigBee, etc.). For example, if the PPM 111 obtains codes and/or generates signatures of ambient media and does not process the codes and/or signatures to identify media, the PPM 111 transmits unprocessed media monitoring data to the media device 108 via the Bluetooth interface 116. In another example, if the PPM 111 obtains codes and/or generates signatures of ambient media and processes the codes and/or signatures to identify the media, the PPM 111 transmits processed media monitoring data to the media device 108 via the Bluetooth interface 116. In some examples, the media monitoring data includes a timestamp and/or location data corresponding to when and/or where the code was extracted or the signature was generated.

The AME application 118 of FIG. 1 obtains the media monitoring data from the example PPM 111 via the example Bluetooth interface 116. In some examples, when the media monitoring data is unprocessed, the AME application 118 may process the unprocessed media monitoring data to determine the media corresponding to the obtained code and/or generated signature to generate processed media monitoring data. The AME application 118 adds a panelist identifier to the media monitoring data. In this manner, when the media monitoring data is transmitted to the example AME 124, the AME 124 can credit the panelist 104 based on the media monitoring data. Additionally, the AME application 118 may perform the same algorithm as the example SDK 114 to generate the census identifier generated by the SDK 114. The AME application 118 adds the census identifier to the media monitoring data. In this manner, the AME 124 can identify which data from the SDK census data received by the AME 124 corresponds to the panelist 104, as further described below. The example AME application 118 transmits the media monitoring data including the panelist identifier and the census identifier to the example AME 124 via the example network 122 using the example wireless interface 112.

The example network 122 of the illustrated example of FIG. 1 is network, such as the Internet, a wireless mobile telecommunications network (e.g., 2G, 3G, LTE, etc.), and/or a cellular network. However, the example network 122 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 122 enables the media provider 102, the media devices 108, 110, and the AME 124 to communicate data (e.g., media, media monitoring data, SDK census data, etc.) between each other.

The example AME 124 of FIG. 1 is a central facility that may be implemented by a server that collects and processes media monitoring data and/or SDK census data from the media devices 108, 110 to generate exposure metrics related to media presented to the panelist 104. The AME 124 analyzes the media monitoring information to identify, for example, which media presentation devices are the most owned, the most-frequently used, the least-frequently owned, the least-frequently used, the most/least-frequently used for particular type(s) and/or genre(s) of media, and/or any other media statistics or aggregate information that may be determined from the data. The media monitoring information may also be correlated or processed with factors such as geodemographic data (e.g., a geographic location of the media exposure measurement location, age(s) of the panelist(s) associated with the media exposure measurement location, an income level of a panelist, etc.) Media presentation device information may be useful to manufacturers and/or advertisers to determine which features should be improved, determine which features are popular among users, identify geodemographic trends with respect to media presentation devices, identify market opportunities, and/or otherwise evaluate their own and/or their competitors' products. The example AME 124 includes the example panelist activity determiner 126 and the example database 128. As further described above, the AME 124 may process unprocessed media monitoring data from the media device 108 of the panelist 104 in order to identify media to which the panelist 104 was exposed based on codes extracted by and/or signatures generated by the PPM 111 in conjunction with ambient media.

The example panelist activity determiner 126 of FIG. 1 determines to what media the panelist 104 was exposed by backfilling incomplete media monitoring data generated by the PPM 111 with SDK census data corresponding to the panelist 104. As described above, media monitoring data generated by the PPM 111 is incomplete when the panelist 104 listens to audio output by the media device 108 using wired or wireless headphones, earphones, ear buds, etc. of when the panelist 104 watches a video output by the media device 108 while the PPM is not facing the video, because the audio output by such devices is not loud to be detected by a sensor of the PPM 111 or the video output by such devices is not detected by a camera or sensor of the PPM 111. Accordingly, media monitoring information is absent for any audio to which the panelist 104 was exposed via the media device 108 when the panelist 104 utilizes headphones. To increase the accuracy of media crediting, the example panelist activity determiner 104 backfills the media monitoring data by identifying SDK census data that corresponds to the panelist 104 and adding media exposure information based on a comparison of the SDK census data and the media monitoring data. Because the SDK census data is anonymous and transmitted from media devices of panelists and non-panelists (e.g., a universe of users), the example panelist activity determiner 126 uses the SDK identifier of the media monitoring data to obtain SDK information corresponding to the media device 108 of the panelist 104. Once the panelist activity determiner 126 backfills the incomplete media monitoring data of the panelist 104 with the corresponding SDK census information, the panelist activity determiner 126 credits the panelist 104 for exposure to media based on the backfilled media monitoring data. In some examples, the example panelist activity determiner 126 may credit the media exposure based on a duration of time (e.g., an hour, a day, a week, a month, a year, etc.). The example panelist activity determiner 126 stored the backfilled media monitoring data corresponding to the panelist 104 and/or crediting results in the example database 128. An example implementation of the example panelist activity determiner 126 is further described below in conjunction with FIG. 2.

In the illustrated example of FIG. 1, the AME 124 includes the example database 128 to record backfilled media monitoring data and/or crediting results corresponding to panelists (e.g., including the example panelist 104). The database 128 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 128 may additionally or alternatively be implemented by one or more double data rate (DDR) memories, such as DDR, DDR2, DDR3, DDR4, mobile DDR (mDDR), etc. The database 128 may additionally or alternatively be implemented by one or more mass storage devices such as hard disk drive(s), compact disk drive(s), digital versatile disk drive(s), solid-state disk drive(s), etc. While in the illustrated example database 128 is illustrated as a single database, the database 128 may be implemented by any number and/or type(s) of databases. Furthermore, the data stored in the database 128 may be in any data format such as, for example, binary data, comma delimited data, tab delimited data, structured query language (SQL) structures, etc.

Figure 2:
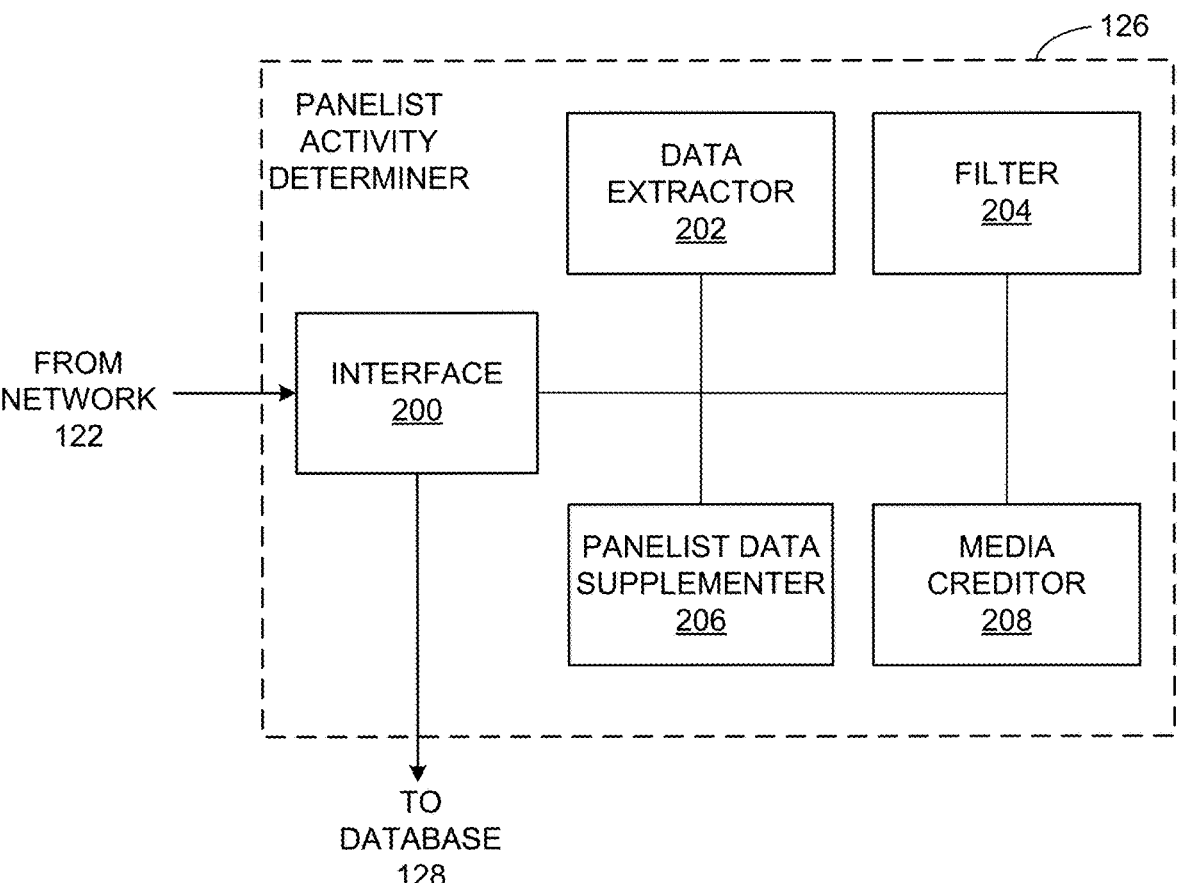
FIG. 2 is a block diagram of an example implementation of the panelist activity determiner of FIG. 1.

FIG. 2 is a block diagram of an example implementation of the panelist activity determiner 126 of FIG. 1. The example panelist activity determiner 126 of FIG. 2 includes an example interface 200, an example data extractor 202, an example filter 204, an example panelist data supplementer 206, and an example media creditor 208.

The example interface 200 of FIG. 2 receives data (e.g., media monitoring data and/or SDK census data) from the example media devices 108, 110 via the network 122 of FIG. 1. The interface 200 may receive the data directly or indirectly (e.g., via radio architecture and/or a processor) from the devices 108, 110. In some examples, the device 108 transmits unprocessed media monitoring data (e.g., codes and/or signatures that have not been processed to identify corresponding media). In such examples, the AME 124 may include software, firmware, and/or hardware to process the unprocessed media monitoring data to identify the corresponding media prior to transmitting the processed media monitoring (e.g., the identified media with timestamps and identifiers) to the example interface 200. Additionally, the interface 200 may transmit supplemented panelist data (e.g., panelist data back filled with corresponding SDK census data) and/or media crediting data to the example database 128 to be stored.

The example data extractor 202 of FIG. 2 processes the media monitoring data and the SDK data to extract identifiers (e.g., a panelist identifier and census identifiers). For example, as described above, the media monitoring data includes a panelist identifier (e.g., a number of code corresponding to the identification of the panelist 104) and an SDK census identifier (e.g., generated by the AME application 118 in the same manner as the SDK 114). Accordingly, the data extractor 202 extracts the panelist identifier to identify the panelist 104 corresponding to the media monitoring data and extracts the census identifier so that the filter 204 can filter through the SDK data to obtain SDK data corresponding to the panelist 104 (e.g., media that was output by the example media device 108 provided by the media provider 102).

The example filter 204 of FIG. 2 utilizes the census identifier extracted from the media monitoring data by the data extractor 202 to filter through the SDK census data to identify SDK census data corresponding to the panelist 104. For example, the filter 204 may filter out SDK census data that does not correspond to the extracted census identifier. In this manner, the filtered SDK census data corresponds to media that was output by the media device 108 of the panelist 104.

The SDK data corresponding to the panelist 104 may or may not include media identified in the media monitoring data. For example, if the media device 108 is playing audio provided by the media provider 102 (e.g., which is included in the SDK census data) using speakers included in and/or attached to media device 108, the PPM 11 may sense the outputted data and extract a code corresponding to the media. Accordingly, the media monitoring data identifies the media based on the code and the SDK census data will include the media. However, if the audio/video is output by the media device 108 with headphones or while the volume of the phone is low or off, the PPM 111 cannot sense the audio. Accordingly, the media monitoring data does not include the media but the SDK information does include the media.

The example panelist data supplementer 206 of FIG. 2 back fills missing media monitoring data for the panelist 104 using the filtered SDK data (e.g., the SDK census data corresponding to the panelist 104). Because media identified in the filtered SDK data may or may not be included in the media monitoring data, the panelist data supplementer 206 may process both the media monitoring data and the filtered SDK data to determine what data should or should not be included in the media monitoring data. For example, if the panelist data supplementer 206 determines that both the media monitoring data and the filtered SDK census data identifies a song at a particular duration of time (e.g., the media device 108 is outputting the song via a speaker that is sensed by the PPM 111), the panelist data supplementer 206 only identifies the song once to not double count the song in the media monitoring data. If the panelist data supplementer 206 determines that the SDK census data identifies a song at a particular duration of time that is not included in the media monitoring data at the particular duration of time (e.g., the song played on the media device 108 and output via head- phones, so that the PPM 111 could not sense the song), the panelist data supplementer 206 may add the media infor- mation from the SDK census data to the media monitoring data. In such examples, the panelist data supplementer 206 may discard the SDK census data in certain pre-defined situations. For example, if the panelist 104 accidently allowed music to play on the media device 108 for many hours while not actually listening to the headphones, the SDK census data may not be representative of actual media exposure. Accordingly, the example panelist data supple- menter 206 may process the SDK census data and discard all or part of SDK data that corresponds to media that have been played for over a threshold amount of time. If the panelist data supplementer 206 determines that the media monitoring data and the filtered SDK census data identify different media at a particular duration of time (e.g., the panelist 104 is listening to a song output by the media device 108 is outputting the song via a speaker while watching an adver- tisement on a television that was sensed by the PPM 111), the panelist data supplementer 206 may add the song iden- tified by the SDK data to the media monitoring device but tag the duration of time as a period of time corresponding to multiple media exposure. The backfilled media monitoring data may be stored in the example database 128 of FIG. 1.

Once the media monitoring data has been backfilled using the SDK census data, the example media creditor 208 of FIG. 2 credits the media exposure to the panelist 104 based on the panelist identification of the media monitoring data. The media creditor 208 may generate a report corresponding to media exposure of the panelist 104 broken up by any duration of time (e.g., a day, a week, a month, etc.). The media creditor 208 credits the media exposure to provide information to advertisers, performance rights organiza- tions, etc. and/or may be used to determine/estimate statis- tics related to the universe of users (e.g., unique audiences). Crediting data may be stored in the example database 128 of FIG. 1.

While an example manner of implementing the example panelist activity determiner 126 of FIG. 1 is illustrated in FIG. 2, one or more of the elements, processes and/or devices illustrated in FIG. 2 may be combined, divided, re-arranged, omitted, eliminated and/or implemented in any other way. Further, the example interface 200, the example data extractor 202, the example filter 204, the example panelist data supplementer 206, the example media creditor 208, and/or, more generally the panelist activity determiner 126 of FIG. 2 may be implemented by hardware, software, firmware and/or any combination of hardware, software and/or firmware. Thus, for example, any of the example interface 200, the example data extractor 202, the example filter 204, the example panelist data supplementer 206, the example media creditor 208, and/or, more generally the panelist activity determiner 126 of FIG. 2 could be imple- mented by one or more analog or digital circuit(s), logic circuits, programmable processor(s), programmable control- ler(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 200, the example data extractor 202, the example filter 204, the example panelist data supplementer 206, the example media creditor 208, and/or, more generally the panelist activity determiner 126 of FIG. 2 is and/or are hereby expressly defined to include a non-transitory computer readable storage device or storage disk such as a memory, a digital versatile disk (DVD), a compact disk (CD), a Blu-ray disk, etc. including the soft- ware and/or firmware. Further still, the example panelist activity determiner 126 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communi- cation and/or indirect communication through one or more intermediary components, and does not require direct physi- cal (e.g., wired) communication and/or constant communi- cation, but rather additionally includes selective communi- cation at periodic intervals, scheduled intervals, aperiodic intervals, and/or one-time events.

Flowcharts representative of example hardware logic, machine readable instructions, hardware implemented state machines, and/or any combination thereof for implementing the example panelist activity determiner 126 of FIG. 2 are shown in FIGS. 3-4. The machine readable instructions may be an executable program or portion of an executable program for execution by a computer processor such as the processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flow- charts illustrated in FIGS. 3-4, many other methods of implementing the example panelist activity determiner 126 of FIG. 2 may alternatively be used. For example, the order of execution of the blocks may be changed, and/or some of the blocks described may be changed, eliminated, or com- bined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firm- ware.

As mentioned above, the example process of FIGS. 3-4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 3 is an example flowchart 300 representative of example machine readable instructions that may be executed by the example panelist activity determiner 126 of FIGS. 1 and/or 2 to supplement media monitoring data of the PPM 111 with SDK census data. Although the flowchart 300 of FIG. 3 is described in conjunction with panelist activity determiner 126 of FIGS. 1 and/or 2, other type(s) of panelist activity determiner(s), and/or other type(s) of processor(s) may be utilized instead.

At block 302, the example interface 200 obtains SDK census data from a universe of media devices corresponding to a duration of time (e.g., a day, a week, a month). The duration of time may be based on user, customer, and/or manufacturer preferences. At block 304, the example interface 200 obtains media monitoring data from the media device 108 of the example panelist 104 corresponding to the duration of time. As described above, the media monitoring data may be missing media exposure information when the panelist 104 listens to audio output by the media device 108 using headphones and/or watches video while the PPM 111 is not facing the media device 108, for example.

At block 306, the example data extractor 202 determines a SDK census identifier and a panelist identifier based on the media monitoring data. For example, the data extractor 202 may extract the panelist identifier and the panelist identifier from the media monitoring data. At block 308, the example data extractor 202 identifies the panelist based on the panelist identifier. In this manner, the media monitoring data can be used to credit the correct panelist 104.

At block 310, the example filter 204 filters the SDK census data based on the determined census identifier to obtain SDK data corresponding to the panelist 104. For example, the filter 204 may filter out all SDK census data that does not correspond to the determined census identifier. Because the AME application 118 generated the determined census identifier in the same manner as the SDK 114, the determined census identifier corresponds to SDK census data of the panelist 104.

At block 312, the example panelist data supplementer 206 backfills the media monitoring data for the panelist 104 with the filtered SDK census data, as further described below in conjunction with FIG. 4. At block 314, the example media creditor 208 credits the panelist 104 for exposure to media for the duration of time based on the backfilled media monitoring data.

FIG. 4 is an example flowchart 312 representative of example machine readable instructions that may be executed by the example panelist activity determiner 126 of FIGS. 1 and/or 2 to backfill media monitoring data for the panelist 104 with the filtered SDK data, as described above in conjunction with block 312 of FIG. 3. Although the flowchart 312 of FIG. 4 is described in conjunction with panelist activity determiner 126 of FIGS. 1 and/or 2, other type(s) of panelist activity determiner(s), and/or other type(s) of processor(s) may be utilized instead.

At block 402, the example panelist data supplementer 206 selects a first sub-duration of the duration of time (e.g., a one minute increment or any sub-duration of time) corresponding to media exposure in the filtered SDK data. For example, if during a particular day, the media device 108 only accessed media from the media provider 102 to play from 1:00 PM to 1:30 PM, there will only be SDK census data from the media device 108 corresponding to the duration of time between 1:00 PM and 1:30 PM. In such an example, the example panelist data supplementer 206 may select the SDK data from the first minute of the 1:00-1:30 duration of time.

At block 404, the example panelist data supplementer 206 determines first media from (e.g., identified in) the filtered SDK data at the selected sub-duration. For example, the panelist data supplementer 206 may determine that the SDK data identifies a first song during the selected sub-duration of time. At block 406, the example panelist data supplementer 206 determines if the first media is included in the media monitoring data at the selected sub-duration. For example, if the SDK data of the sub-duration correspond to a song, the panelist data supplementer 206 may determine whether the media monitoring data corresponds to the song at the sub-duration of time (e.g., based on a media identifier and corresponding timestamp of the media monitoring data). The first media being included in the media monitoring data and the SDK data corresponds to the media output device 108 outputting the media via speakers and being sensed by the PPM 111.

If the example panelist data supplementer 206 determines that the first media is included in the media monitoring data at the selected sub-duration (block 406: YES), the panelist data supplementer 206 maintains identification of the first media as part of the media monitoring data at the selected sub-duration of time (block 408). For example, the panelist data supplementer 206 may discard the first media data from the SDK census data, as to not double count the first media.

If the example panelist data supplementer 206 determines that the first media is not included in the media monitoring data at the selected sub-duration (block 406: NO), the panelist data supplementer 206 adds the first media data as part of the media monitoring data at the selected sub-duration of time (block 410) (e.g., because the media was output by the example media device 108 but not sensed by the PPM 111). Alternatively, in some examples, the panelist data supplementer 206 may discard the first media information by determining if the application corresponding to the SDK data was playing for more than a threshold duration of time. As described above in conjunction with FIG. 2, if the media device 108 is unintendedly left on, the SDK may include media data corresponding to media to which the panelist 104 was not actually exposed. The probability that the panelist 104 was not exposed to media output by the media device 108 increases as the amount of time that the media device 108 outputs media increases. Thus, the threshold may correspond to a threshold corresponding to statistical analysis.

At block 412, the example panelist data supplementer 206 determines if second media (e.g., different than the first media) is included in the media monitoring data. Second media may be included in the media monitoring data when, for example, the panelist 104 is exposed to the first media via the media device 108 and the second media via a second media device (e.g., a television, radio, etc.) and sensed by the PPM 111 of FIG. 1.

If the example panelist data supplementer 206 determines that the second media is not included in the media monitoring data (block 412: NO), the process continues to block 416. If the example panelist data supplementer 206 determines that the second media is included in the media monitoring data (block 412: YES), the panelist data supplementer 206 tags the selected sub-duration as corresponding to a multiple media exposure (block 414). In this manner, the media creditor 208 can determine how to credit the first and/or second media (e.g., credit both, none, or one of the first or second media) based on user, customer, and/or manufacturer preferences. At block 416, the example panelist data supplementer 206 determines if additional media exposure data in the filtered SDK data at a subsequent sub-duration of time of the duration of time. For example, if the first iteration corresponds to a first minute of SDK census data from 1:00-1:30, the example panelist data determiner 206 determines that there is additional media exposure data in the filtered SDK data at a subsequent duration of time of the duration of time (e.g., the second minute of the 1:00-1:30 duration).

If the example panelist data supplementer 206 determines that there is no additional media exposure data in the filtered SDK data at a subsequent sub-duration of time of the duration of time (block 416: NO), the process returns to block 314 of FIG. 3. If the example panelist data supplementer 206 determines that there is additional media exposure data in the filtered SDK data at a subsequent sub-duration of time of the duration of time (block 416: YES), the example panelist data supplementer 206 selects the subsequent sub-duration of the duration of the duration of time corresponding to the media exposure in the filtered SDK data (block 418) and the process returns to block 404 to determine how to continue to backfill media monitoring with the SDK data at the subsequent sub-duration.

Figure 5:
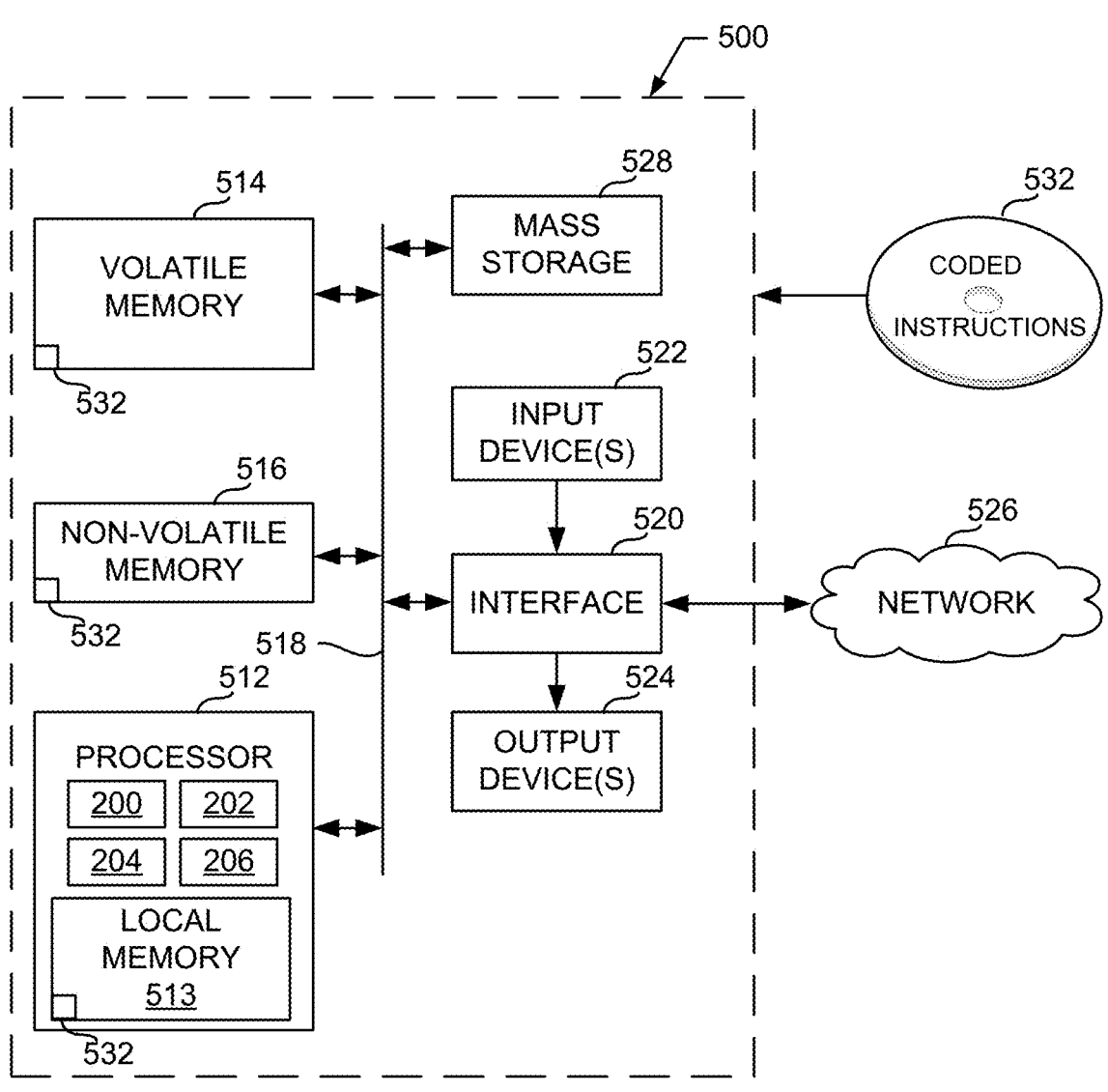
FIG. 5 is a block diagram of an example processor platform structured to execute the instructions of FIGS. 3 and/or 4 to implement the example panelist activity determiner of FIGS. 1 and 2.

FIG. 5 is a block diagram of an example processor platform 500 structured to execute the instructions of FIG. 3-4 to implement the example panelist activity determiner 126 of FIG. 2. The processor platform 500 can be, for example, a server, a personal computer, a workstation, a self-learning machine (e.g., a neural network), a mobile device (e.g., a cell phone, a smart phone, a tablet such as an iPad™), or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 512 implements the example interface 200, the example data extractor 202, the example filter 204, the example panelist data supplementer 206, and the example media creditor 208 of FIG. 2.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

The machine executable instructions 532 of FIGS. 3-4 may be stored in the mass storage device 528, in the volatile memory 514, in the non-volatile memory 516, and/or on a removable non-transitory computer readable storage medium such as a CD or DVD.

From the foregoing, it will be appreciated that example methods, apparatus and articles of manufacture have been to determine media exposure of a panelist by backfilling media monitoring data corresponding to a PPM with SDK census data. The disclosed methods, apparatus and articles of manufacture provide more accurate and complete media exposure data of panelist, thereby providing more accurate media crediting and/or more accurate statistical estimations of media exposure for a universe of users. Disclosed methods, apparatus and articles of manufacture are accordingly directed to one or more technical improvement(s) to providing more accurate and complete media monitoring data by leveraging SDK census data from panelists.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A computing system comprising a processor and a memory, the computing system configured to perform a set of operations comprising:

determining an identifier from media monitoring data corresponding to a meter of a panelist;

filtering anonymized census data from a plurality of media devices based on the identifier;

determining that the filtered anonymized census data includes first media data that is not included in the media monitoring data;

based on determining that the filtered anonymized census data includes the first media data that is not included in the media monitoring data, combining the first media data with the media monitoring data; and crediting exposure to media for the panelist based on the first media data and the media monitoring data.

2. The computing system of claim 1, wherein the identifier is an anonymized identifier.

3. The computing system of claim 1, wherein the first media data is indicative of first media that is consumed while audio of the first media cannot be ambiently collected.

4. The computing system of claim 1, wherein the first media data is indicative of first media that is consumed while the panelist is wearing headphones.

5. The computing system of claim 1, wherein the anonymized census data is software development kit census data generated by software development kits installed on applications, devices, or websites.

6. The computing system of claim 5, wherein:

the software development kit census data comprises census identifiers generated by the software development kits, and the identifier is one of the census identifiers.

7. The computing system of claim 6, wherein the meter is a portable personal meter that is worn or carried by the panelist.

8. A method comprising:

determining, by a computing system, an identifier from media monitoring data corresponding to a meter of a panelist;

filtering, by the computing system, anonymized census data from a plurality of media devices based on the identifier;

determining, by the computing system, that the filtered anonymized census data includes first media data that is not included in the media monitoring data;

based on determining that the filtered anonymized census data includes the first media data that is not included in the media monitoring data, combining, by the computing system, the first media data with the media monitoring data; and crediting exposure to media for the panelist based on the first media data and the media monitoring data.

9. The method of claim 8, wherein the identifier is an anonymized identifier.

10. The method of claim 8, wherein the first media data is indicative of first media that is consumed while audio of the first media cannot be ambiently collected.

11. The method of claim 8, wherein the first media data is indicative of first media that is consumed while the panelist is wearing headphones.

12. The method of claim 8, wherein the anonymized census data is software development kit census data generated by software development kits installed on applications, devices, or websites.

13. The method of claim 12, wherein:

the software development kit census data comprises census identifiers generated by the software development kits, and the identifier is one of the census identifiers.

14. The method of claim 13, wherein the meter is a portable personal meter that is worn or carried by the panelist.

15. A non-transitory computer-readable medium having stored therein instructions that, when executed by a computing system, cause the computing system to perform a set of operations comprising:

determining an identifier from media monitoring data corresponding to a meter of a panelist;

filtering anonymized census data from a plurality of media devices based on the identifier;

determining that the filtered anonymized census data includes first media data that is not included in the media monitoring data;

based on determining that the filtered anonymized census data includes the first media data that is not included in the media monitoring data, combining the first media data with the media monitoring data; and crediting exposure to media for the panelist based on the first media data and the media monitoring data.

16. The non-transitory computer-readable medium of claim 15, wherein the identifier is an anonymized identifier.

17. The non-transitory computer-readable medium of claim 15, wherein the first media data is indicative of first media that is consumed while audio of the first media cannot be ambiently collected.

18. The non-transitory computer-readable medium of claim 15, wherein the first media data is indicative of first media that is consumed while the panelist is wearing headphones.

19. The non-transitory computer-readable medium of claim 15, wherein the anonymized census data is software development kit census data generated by software development kits installed on applications, devices, or websites.

20. The non-transitory computer-readable medium of claim 19, wherein:

the software development kit census data comprises census identifiers generated by the software development kits, and the identifier is one of the census identifiers.

* * * * *